J. H. NOONAN.
GAS COOKER.
APPLICATION FILED APR. 21, 1914. RENEWED MAY 3, 1917.

1,228,956.

Patented June 5, 1917.
2 SHEETS—SHEET 1.

JOSEPH HENRY NOONAN
INVENTOR
by Lawrence Langner
ATTORNEY.

J. H. NOONAN.
GAS COOKER.
APPLICATION FILED APR. 21, 1914. RENEWED MAY 3, 1917.

1,228,956.

Patented June 5, 1917.
2 SHEETS—SHEET 2.

Joseph Henry Noonan
Inventor
by Lawrence Langner
Attorney.

UNITED STATES PATENT OFFICE.

JOSEPH HENRY NOONAN, OF AUCKLAND, NEW ZEALAND.

GAS-COOKER.

1,228,956.　　　　　Specification of Letters Patent.　　Patented June 5, 1917.

Application filed April 21, 1914, Serial No. 833,532. Renewed May 3, 1917. Serial No. 166,278.

*To all whom it may concern:*

Be it known that I, JOSEPH HENRY NOONAN, of No. 234 Hobson street, situate in the city of Auckland, in the Provincial District of Auckland, in the Dominion of New Zealand, general dealer, do hereby declare the nature of this invention in Gas-Cookers and in what manner the same is to be performed, to be particularly described and ascertained in and by the following statement.

My invention consists of an apparatus for the toasting of bread or other articles of a like nature, the grilling of steak, chops, fish or other substance upon both sides at the same time, the cooking of eggs without water, the boiling of water and other liquids, and the frying of any other article of food as may be desired.

Figure 1:
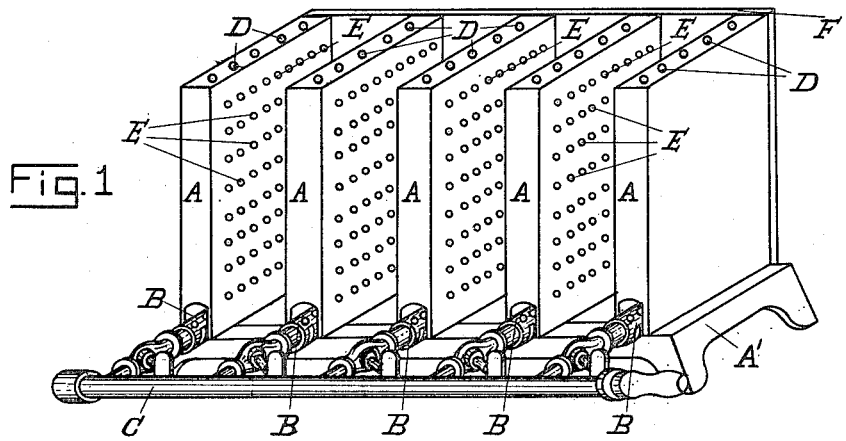
Figure 1 is a perspective view of the cooker with the front removed.
Figure 2:
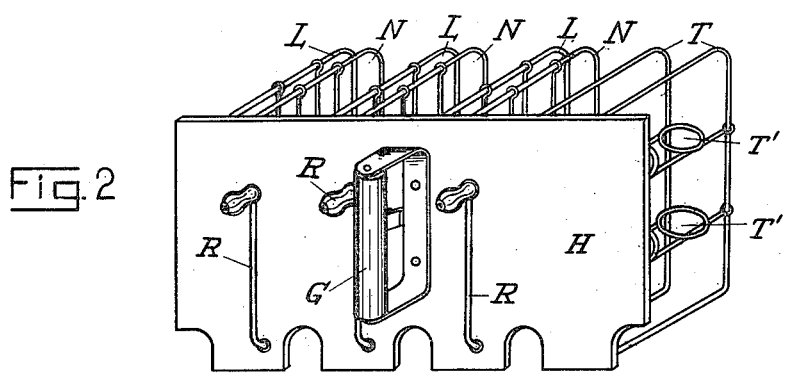
Fig. 2 is a perspective view of the removable front and the supporting frames attached thereto.
Figure 3:
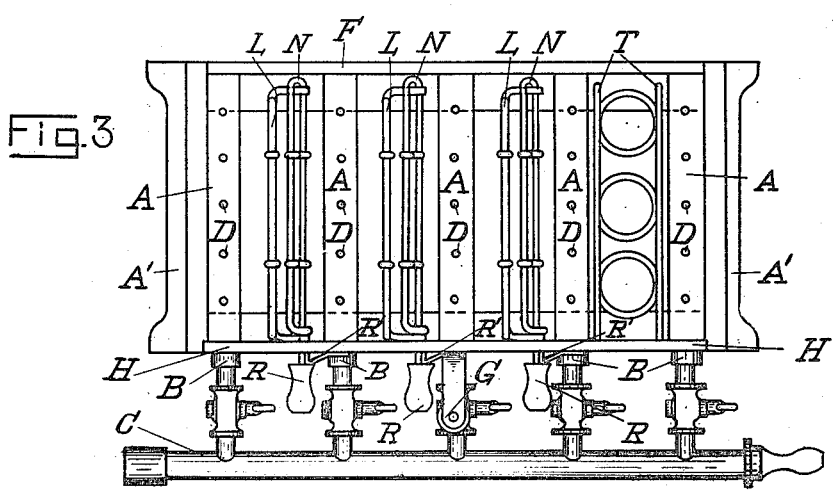
Fig. 3 is a plan of the apparatus as a whole, showing the parts illustrated in Figs. 1 and 2 assembled.
Figure 4:
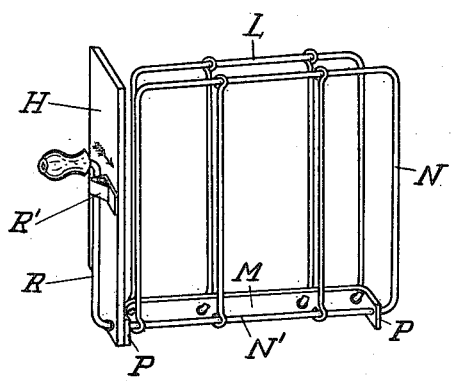
Fig. 4 is a perspective view of part of the removable front illustrating the grids or frames attached thereto.
Figure 5:
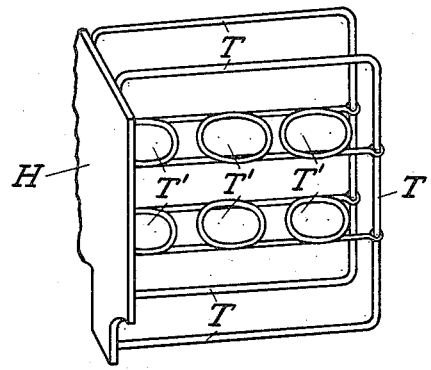
Fig. 5 is a perspective view of part of the removable front and the egg-supporting means carried thereby.

The construction of the aforesaid apparatus is as follows: Two or more rectangular chambers marked A composed of cast or wrought iron, steel, aluminum, or other suitable metal and open at the bottom are erected upon a suitable base A' at certain distances apart. These chambers A are heated throughout by the use of coal or other gases most suitable through supply pipe C and gas burners marked B in the interior of each chamber, such chambers being perforated with small holes E distributed over their interior faces. The extreme tops of these chambers are also perforated with holes D to insure the release of the products of combustion which products or heated gases can be utilized for boiling, baking or frying purposes, by placing the necessary utensils above such holes.

The bread or other articles to be toasted or grilled are held by wire frames marked L, N, so as to occupy the spaces between the chambers A. These wire frames are attached to a movable metal plate H forming the front or door of the apparatus, and are arranged in pairs of one fixed and one hinged frame secured vertically and at right angles to the plate H, provided with a handle G, the hinged frame in each pair of frames being adapted to be swung outward from the stationary frame on its lower horizontal bar M so that the articles of food may be placed between the frames. The lower bars of the hinged frames pass through the plate H and terminate in handles R on the outside of the apparatus.

The frames T, T for holding the eggs T' are similar to the fixed frames before mentioned, except that divisions suitable for carrying the eggs are arranged between them.

Another metal plate F is fixed permanently across the back of the apparatus, this and the plate or door H in front having the effect of concentrating the heat on to the articles held between the chambers.

I claim—

1. A cooking device of the character described comprising in combination a plurality of stationary heating chambers spaced apart and each comprising heat radiating perforated top and side walls, burners adapted to heat said chambers and walls, a grid-supporting member forming a wall of the cooking device and removable relatively to said heating chambers and a plurality of grids carried by said member and adapted when said member is placed in position to be interposed between said heating chambers.

2. A cooking device of the character described comprising in combination a plurality of stationary heating means spaced apart, a grid-supporting member movable relatively to said heating means, a grid supported by said member comprising a fixed and a movable portion, and means located on the outer face of said movable member for operating the movable portion of said grid.

3. A cooking device of the character described comprising in combination a plurality of fixed heating chambers spaced apart and each comprising perforated top and side heat-radiating walls, burners adapted to heat said chambers and walls, a movable grid-supporting member forming a wall of the cooking device, and a plurality of grids supported by said member and adapted to be interposed between said heating chambers, each grid comprising a fixed frame portion and a movable frame portion and means for operating the movable portion located on the outer face of said movable member.

4. A cooking device of the character described, comprising in combination a plurality of heating chambers spaced apart, a grid supporting member forming a wall of the cooking device and egg-cooking grids interposed between said chambers and having divisions arranged in them suitable for carrying the eggs.

5. A cooking device of the character described comprising in combination a plurality of stationary heating chambers spaced apart and closed excepting for perforations in their top and side walls, a movable grid supporting member forming a wall of the cooking device and carrying egg cooking framed grids adapted to be interposed between said chambers and having divisions suitable for carrying eggs.

6. A cooking device of the character described, comprising a base plate, a plurality of vertically arranged rectangular heating chambers fixed to said base plate and formed with perforations in their top and side walls, a gas supply pipe, a connection from said pipe to each of said heating chambers, means for controlling the supply of gas in each connection, a plate secured to the ends of the heating chambers and forming the back wall thereof, a removable grid supporting member forming the front wall of the cooking device, a handle of heat insulating material on the front of the grid supporting member for manipulating same, a series of grids carried by said grid supporting member and each comprising a fixed and a movable framed portion, and a plurality of handles located at the front of said grid supporting member and connected to said movable framed portions of the grids for operating same, substantially as herein described.

Dated at Auckland in the Dominion of New Zealand the 17th day of March, 1914.

JOSEPH HENRY NOONAN.

Witnesses:
ETHEL FRANCES COURTNEY,
FRANK YOUNGHUSBAND.